| MAGNIFICATION = 100 X | | NUMER. APERT. = 0.12 | | | | |
|---|---|---|---|---|---|---|
| LENS | FOCAL LGTH. | RADII | THICKNESS | SPACES | $n_D$ | $V$ |
| I | $F_I = 12.041$ | $R_1 = \infty$ | $t_1 = 1.5$ | $S_1 = 6.6$ | 1.524 | 59.5 |
| | | $-R_2 = 6.3096$ | | | | |
| II | $F_{II} = 18.341$ NEG.=−8.763 POS.= 6.277 | $R_3 = \infty$ | $t_2 = 2.0$ NEG. = 0.5 POS.= 1.5 | $S_2 = 1.0$ | NEG.= 1.720 | 29.3 |
| | | $R_4 = 6.3096$ | | | | |
| | | $-R_5 = 6.3096$ | | $S_3 = 79.0$ | POS.= 1.524 | 59.5 |
| III | $F_{III} = 29.695$ | $R_6 = 15.560$ | $t_3 = 3.1$ | $S_4 = 24.3$ | 1.524 | 59.5 |
| | | $R_7 = \infty$ | | | | |
| IV | $F_{IV} = 20.168$ | $R_8 = 10.568$ | $t_4 = 2.0$ | $S_5 = 20.2$ | 1.524 | 59.5 |
| | | $R_9 = \infty$ | | | | |

INVENTOR.
HAROLD E. ROSENBERGER
BY Frank C. Parker
ATTORNEY 3,241,443
OPTICAL SYSTEM FOR MICROSCOPES HAVING A TWO-COMPONENT OBJECTIVE
Harold E. Rosenberger, Brighton, N.Y., assignor to Bausch & Lomb Incorporated, Rochester, N.Y., a corporation of New York
Filed Dec. 26, 1962, Ser. No. 247,210
3 Claims. (Cl. 88—57)

The present invention relates to a simple optical system for a microscope and more particularly it relates to improvements in such systems.

It is a prime object of this invention to provide a novel optical system of high magnification which is extremely simple in structure for low cost and is capable of unusually high-grade performance as judged by the excellent state of correction for chromatic and spherical aberrations, coma, and astigmatism.

A further object is to provide such a device which utilizes the least number of different lens curvatures together with plano surfaces to reduce the cost thereof and for the same purpose utilizes the same kind of glass in all collective elements.

Further objects and advantages will be found in the form and arrangement of the parts of the optical system and in the constructional details thereof from a study of the specification herebelow taken in connection with the accompanying drawing, in which.

Figures 1, 2:
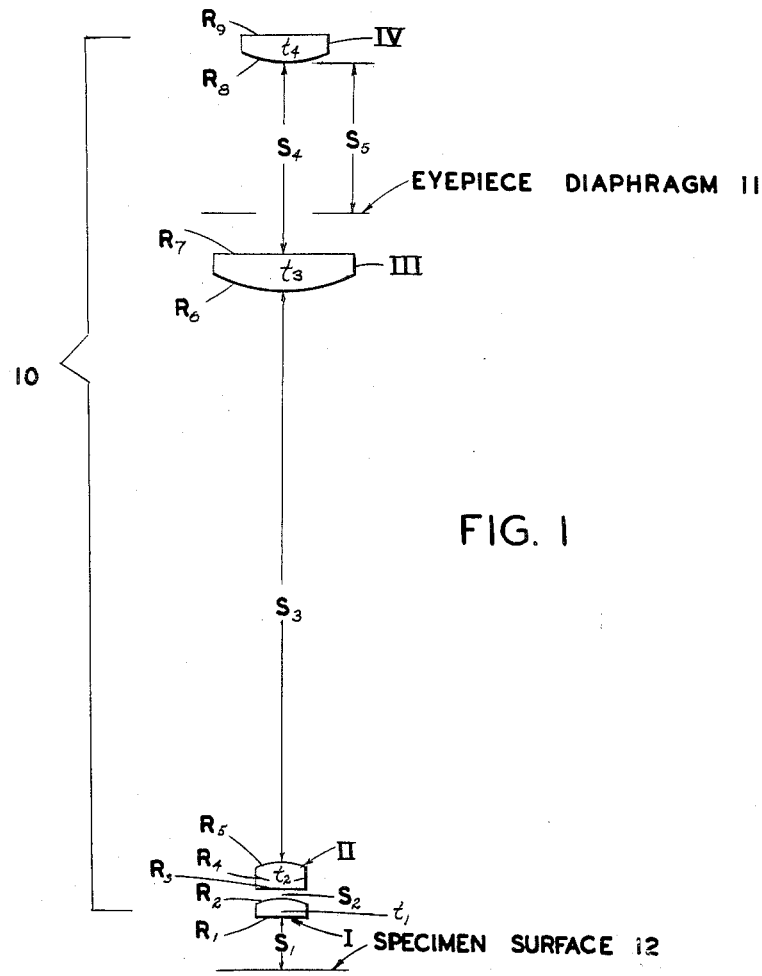
FIG. 1 is an optical diagram showing the present invention.
FIG. 2 is a chart of constructional data related to a preferred form of said invention.

As shown in the drawing, said optical system is generally designated by numeral 10 and comprises a succession of four plano-convex lenses which are optically aligned with each other and are constructed so as to achieve a high numerical aperture of at least 0.12 and a magnification of substantially 100×. Said optical system 10 is furthermore so constructed as described herebelow that an unusually fine state of correction of chromatic and spherical aberrations is achieved as well as excellent correction of coma and astigmatism.

According to this invention, the optical system 10 features an ultimately simple and low-cost construction as set forth herebelow with particular reference to the character of the lens surfaces and properties of the lens materials.

Comprised in the optical system 10 is a succession of four optically aligned plano-convex lenses which are designated I to IV progressively numbering from the front of the system. The plano sides of lenses I and II face forwardly toward entrant light while the plano sides of lenses III and IV face rearwardly, and an eyelens diaphragm 11 is situated between the rearmost lenses III and IV. All of the lenses are singlets except lens II which is a doublet. Lens I is axially spaced rearwardly of a specimen surface 12 at a distance represented by $S_1$ and together with lens II constitutes the objective portion of the system 10. Lens II is a doublet which is spaced at an axial distance designated $S_2$ from lens I and is composed of a negative plano-concave element in contact on its rear side with a positive double convex lens element.

For cost-reducing reasons in the production of lenses I and II and for simplicity of the assembly operation in the doublet lens, all of the radii of the lens curvatures of these lenses are substantially of the same numerical value.

The eyepiece section of the optical system 10 consists of the aforesaid lens III which is spaced at an axial distance designated $S_3$ rearwardly of the doublet lens II, and further consists of the lens IV which is separated from lens III by an axial distance designated $S_4$. As aforementioned, the diaphragm 11 is provided in the plane of the image formed cooperatively by lenses I, II and III, and said diaphragm is located at an axial distance $S_5$ forwardly of lens IV. The diameter of said diaphragm 11 is substantially 1.2F where F represents the positive focal length formed cooperatively by lenses I and II.

In fulfillment of the objects of the present invention, the values of the optical parameters of the optical system 10 are specified in the table of mathematical statements herebelow wherein the respective focal lengths relating to the lenses I to IV are represented by $F_I$ to $F_{IV}$, $R_1$ to $R_9$ represent the successive radii of the lens surfaces on said lenses and lens elements, and the minus (—) sign used with $R_2$ and $R_5$ applies to all lens radii which have a center of curvature located on the object or entrant side of the optical system with respect to the apex of the lens surface, $t_1$ to $t_4$ represent the axial thicknesses of the lenses I to IV, $S_1$ to $S_5$ represent the adjacent axial air spaces, and $n_D$ and $\nu$ represent the refractive index and Abbe number respectively of the lens material used in said lenses.

$1.43F < F_I < 1.58F$
$2.18F < F_{II} < 2.41F$
$3.52F < F_{III} < 3.90F$
$2.39F < F_{IV} < 2.65F$
$R_1 > \pm(F_I + F_{II} + F_{III} + F_{IV})$
$.749F < -R_2 < .828F$
$R_3 > \pm(F_I + F_{II} + F_{III} + F_{IV})$
$.749F < R_4 < .828F$
$.749F < -R_5 < .828F$
$1.84F < R_6 < 2.04F$
$R_7 > \pm(F_I + F_{II} + F_{III} + F_{IV})$
$1.25F < R_8 < 1.39F$
$R_9 \pm (F_I + F_{II} + F_{III} + F_{IV})$
$.178F < t_1 < .196F$
$.238F < t_2 < .263F$
$.368F < t_3 < .406F$
$.238F < t_4 < .263F$
$.784F < S_1 < .866F$
$.119F < S_2 < .131F$
$9.38F < S_3 < 10.4F$
$2.88F < S_4 < 3.18F$
$2.39F < S_5 < 2.65F$

|  | $n_D$ | $\nu$ |
| --- | --- | --- |
| Lens I | 1.520 to 1.528 | 57.0 to 62.0 |
| Lens II (Neg. Elem.) | 1.718 to 1.722 | 27.0 to 32.0 |
| Lens II (Pos. Elem.) | 1.520 to 1.528 | 57.0 to 62.0 |
| Lens III | 1.520 to 1.528 | 57.0 to 62.0 |
| Lens IV | 1.520 to 1.528 | 57.0 to 62.0 |

Furthermore, doublet lens II is composed of a front plano-concave lens element which is in contact on its rear surface with a double convex lens element and the last-named element has an axial thickness of substantially $.75t_2$. With regard to focal lengths, the plano-concave lens element has a negative focal length of substantially $-1.095F$ and the double convex element has a positive focal length of substantially $.784F$.

Since the optical system 10 is designed for the low-priced market, all of the lens elements therein are very simple in form and construction to achieve minimum cost. To further reduce the cost of the constituent lens elements, each such element is manufactured in commercial quantities by an economical process wherein a manufacturing tolerance is applied to each lens parameter thereof. Although a very exact approach to the precise nominal lens parameter values could be achieved by long and skillful grinding and polishing, such a practice is not feasible because of its excessive cost.

For practical reasons, therefore, commercially acceptable ranges of values are set forth in the preceding table of lens parameter values, said ranges being so chosen as to provide a multiplicity of modified but near-duplicate optical systems of the kind here disclosed, the lens parameters of each such optical system lying within the ranges given in the tables. Each such slightly different or non-ideal optical system is selectively assembled by skilled workmen from a great number of slightly dissimilar lenses having many non-standard lens parameter values within the stated ranges so that a degree of compensation of aberrations is achieved whereby the resulting optical performance is good and is commercially acceptable. Said non-standard lens parameter values may all lie unilaterally on the same side of nominal values in which case the optical result is closer to an ideal condition than a totally random choice of parameter values within the specified ranges.

The values of said optical parameters are more specifically set forth for one form of the present invention in the table of mathematical statements herebelow wherein the various parameters are designated in the same manner as found in the above table.

$F_I = 1.51F$
$F_{II} = 2.29F$
$F_{III} = 3.71F$
$F_{IV} = 2.52F$
$R_1 = \infty$
$-R_2 = .788F$
$R_3 = \infty$
$R_4 = .788F$
$-R_5 = .788F$
$R_6 = 1.94F$
$R_7 = \infty$
$R_8 = 1.32F$
$R_9 = \infty$
$t_1 = .187F$
$t_2 = .250F$
$t_3 = .387F$
$t_4 = .250F$
$S_1 = .825F$
$S_2 = .125F$
$S_3 = 9.87F$
$S_4 = 3.03F$
$S_5 = 2.52F$

|  | $n_D$ | $\mu$ |
|---|---|---|
| Lens I | 1.524 | 59.5 |
| Lens II (Neg. elem.) | 1.720 | 29.3 |
| Lens II (Pos. elem.) | 1.524 | 59.5 |
| Lens III | 1.524 | 59.5 |
| Lens IV | 1.524 | 59.5 |

One preferred form of the present invention is numerically specified in the chart of values of the above-mentioned optical parameters as shown herebelow.

Magnification = 100×     Numerical Aperture = 0.12

| Lens | Focal Length | Radii | Thicknesses | Spaces | $n_D$ | $\mu$ |
|---|---|---|---|---|---|---|
| I | $F_I$ = 12.041 | $R_1 = \infty$<br>$-R_2 = 6.3096$ | $t_1$ = 1.5 | $S_1 = 6.6$ | 1.524 | 59.5 |
| II | $F_{II}$ = 18.341<br>Neg. = −8.763<br>Pos. = 6.277 | $R_3 = \infty$<br>$R_4 = 6.3096$<br>$-R_5 = 6.3096$ | $t_2$ = 2.0<br>Neg. = 0.5<br>Pos. = 1.5 | $S_2 = 1.0$ | Neg. = 1.720<br>Pos. = 1.524 | 29.3<br>59.5 |
| III | $F_{III}$ = 29.695 | $R_6 = 15.560$<br>$R_7 = \infty$ | $t_3$ = 3.1 | $S_3 = 79.0$<br>$S_4 = 24.3$ | 1.524 | 59.5 |
| IV | $F_{IV}$ = 20.168 | $R_8 = 10.568$<br>$R_9 = \infty$ | $t_4$ = 2.0 | $S_5 = 20.2$ | 1.524 | 59.5 |

Although only a preferred form of this invention has been shown and described in detail, other forms are possible and changes may be made in the optical parameters thereof within the above-stated ranges without departing from the spirit of the invention as defined in the claims here appended.

I claim:

1. An optical system for a microscope having a numerical aperture of .12 and a magnification of substantially 100× and being corrected for chromatic and spherical aberration, coma and astigmatism, said system consisting of four optically aligned plano-convex lenses numbered successively I to IV, lenses I, III and IV being singlets and lens II being a doublet, lenses I and II having their plano sides facing toward the front and lenses III and IV having their plano sides facing rearwardly, lens I being spaced at an object distance $S_1$ rearwardly of a specimen surface and jointly with lenses II and III forming an image of said specimen in a rearward eyepiece diaphragm, lenses I and II being separated by an axial distance designated $S_2$, lenses II and III being separated by an air space designated $S_3$, said lenses III and IV being separated by an air space designated $S_4$, and said diaphragm being located at an axial distance designated $S_5$ forwardly of lens IV, the constructional data for said system being given in the table of mathematical expressions herebelow wherein the air spaces $S_1$ to $S_5$ are designated as hereabove $F_I$ to $F_{IV}$ designate the focal lengths of the successive lenses I to IV, $R_1$ to $R_9$ designate the radii of the successive lens surfaces numbering from the front of the system, the minus (−) sign used therewith being applied to any lens surface having a center of curvature lying on the object side of the vertex of the surface, the thicknesses of the successive lenses are designated $t_1$ to $t_4$, the refractive index and Abbe number of the glass in said lenses being designated $n_D$ and $\nu$ respectively, and the combined focal length of lenses I to II being designated F, $1.43F < F_I < 1.58F$
$2.18F < F_{II} < 2.41F$
$3.52F < F_{III} < 3.90F$
$2.39F < F_{IV} < 2.65F$
$R_1 > \pm(F_I+F_{II}+F_{III}+F_{IV})$
$.749F < -R_2 < .828F$
$R_3 > \pm(F_I+F_{II}+F_{III}+F_{IV})$
$.749F < R_4 < .828F$
$.749F < -R_5 < .828F$
$1.84F < R_6 < 2.04F$
$R_7 > \pm(F_I+F_{II}+F_{III}+F_{IV})$
$1.25F < R_8 < 1.39F$
$R_9 > \pm(F_I+F_{II}+F_{III}+F_{IV})$
$.178F < t_1 < .196F$
$.238F < t_2 < .263F$
$.368F < t_3 < .406F$
$.238F < t_4 < .263F$
$.784F < S_1 < .866F$
$.119F < S_2 < .131F$
$9.38F < S_3 < 10.4F$
$2.88F < S_4 < 3.18F$
$2.39F < S_5 < 2.65F$

|  | $n_D$ | $\mu$ |
|---|---|---|
| Lens I | 1.520 to 1.528 | 57.0 to 62.0 |
| Lens II (Neg. Elem.) | 1.718 to 1.722 | 27.0 to 32.0 |
| Lens II (Pos. Elem.) | 1.520 to 1.528 | 57.0 to 62.0 |
| Lens III | 1.520 to 1.528 | 57.0 to 62.0 |
| Lens IV | 1.520 to 1.528 | 57.0 to 62.0 | said doublet lens II being composed of a plano-concave lens element and a double convex lens element in contact with the rear surface thereof, the axial thickness of said double convex element being substantially $.75t_2$.

2. An optical system for a microscope having a numerical aperture of .12 and a magnification of substantially 100× and being corrected for chromatic and sperical aberration, coma and astigmatism, said system consisting of four optically aligned plano-convex lenses numbered successively I to IV, lenses I, III and IV being singlets and lens II being a doublet, lenses I and II having their plano sides facing toward the front and lenses III and IV having their plano sides facing rearwardly, lens I being spaced at an object distance $S_1$ rearwardly of a specimen surface and jointly with lenses II and III forming an image of said specimen in a rearward eyepiece diaphragm, lenses I and II being separated by an axial distance designated $S_2$, lenses II and III being separated by an air space designated $S_3$, said lenses III and IV being separated by an air space designated $S_4$, and said diaphragm being located at an axial distance designated $S_5$ forwardly of lens IV, the constructional data for said system being given in the table of mathematical expressions herebelow wherein the air spaces $S_1$ to $S_5$ are designated as hereabove, $F_I$ to $F_{IV}$ designate the focal lengths of the lenses I to IV, $R_1$ to $R_9$ designate the radii of the successive lens surfaces numbering from the front of the system, the minus (—) sign used therewith being applied to any lens surface having a center of curvature lying on the object side of the vertex of the surface, the thicknesses of the successive lenses are designated $t_1$ to $t_4$, the refractive index and Abbe number of the glass in said lenses being designated $n_D$ and $\nu$ respectively, and the combined focal length of lenses I and II being designated F, $F_I = 1.51F$
$F_{II} = 2.29F$
$F_{III} = 3.71F$
$F_{IV} = 2.52F$
$R_1 = \infty$
$-R_2 = .788F$
$R_3 = \infty$
$R_4 = .788F$
$-R_5 = .788F$
$R_6 = 1.94F$
$R_7 = \infty$
$R_8 = 1.32F$
$R_9 = \infty$
$t_1 = .187F$
$t_2 = .250F$
$t_3 = .387F$
$t_4 = .250F$
$S_1 = .825F$
$S_2 = .125F$
$S_3 = 9.87F$
$S_4 = 3.03F$
$S_5 = 2.52F$

|  | $n_D$ | $\nu$ |
|---|---|---|
| Lens I | 1.524 | 59.5 |
| Lens II (Neg. Elem.) | 1.720 | 29.3 |
| Lens II (Pos. Elem.) | 1.524 | 59.5 |
| Lens III | 1.524 | 59.5 |
| Lens IV | 1.524 | 59.5 | said doublet lens II being composed of a plano-concave lens element and a double convex lens element being substantially $.75t_2$, and of, the axial thickness of said double convex element being substantially $.75t_2$, and said diaphragm having a diameter of substantially 1.2F.

3. An optical system for a microscope having a numerical aperture of .12 and a magnification of substantially 100× and being corrected for chromatic and spherical aberration, coma and astigmatism, said system consisting of four optically aligned plano-convex lenses numbered successively I to IV, lenses I, III and IV being singlets and lens II being a doublet, lenses I and II having their plano sides facing toward the front and lenses III and IV having their plano sides facing rearwardly, lens I being spaced at an object distance $S_1$ rearwardly of a specimen surface and jointly with lenses II and III forming an image of said specimen in a rearward eyepiece diaphragm, lenses I and II being separated by an axial space designated $S_2$, lenses II and III being separated by an air space designated $S_3$, said lenses III and IV being separated by an air space designated $S_4$, and said diaphragm being located at an axial distance designated $S_5$ forwardly of lens IV, the constructional data for said system being given in the chart of numerical values herebelow wherein the air spaces $S_1$ to $S_5$ are designated as hereabove, $F_I$ to $F_{IV}$ designate the focal lengths of the lenses I to IV, $R_1$ to $R_9$ designate the radii of the successive lens surfaces numbering from the front of the system, the minus (—) sign used therewith being applied to any lens surface having a center of curvature lying on the object side of the vertex of the surface, the thicknesses of the successive lenses are designated $t_1$ to $t_4$, and the refractive index and Abbe number of the glass in said lenses being designated $n_D$ and $\nu$ respectively, Magnification = 100×   Numerical Aperture = 0.12

| Lens | Focal Length | Radii | Thicknesses | Spaces | $nD$ | $\nu$ |
|---|---|---|---|---|---|---|
| I | $F_I$ = 12.041 | $R_1 = \infty$<br>$-R_2 = 6.3096$ | $t_1 = 1.5$ | $S_1 = 6.6$ | 1.524 | 59.5 |
| II | $F_{II}$ = 18.341<br>Neg. = −8.763<br>Pos. = 6.277 | $R_3 = \infty$<br>$R_4 = 6.3096$<br>$-R_5 = 6.3096$ | $t_2 = 2.0$<br>Neg. = 0.5<br>Pos. = 1.5 | $S_2 = 1.0$ | Neg. = 1.720<br>Pos. = 1.524 | 29.3<br>59.5 |
| III | $F_{III}$ = 29.695 | $R_6 = 15.560$<br>$R_7 = \infty$ | $t_3 = 3.1$ | $S_3 = 79.0$<br>$S_4 = 24.3$ | 1.524 | 59.5 |
| IV | $F_{IV}$ = 20.168 | $R_8 = 10.568$<br>$R_9 = \infty$ | $t_4 = 2.0$ | $S_5 = 20.2$ | 1.524 | 59.5 |

No references cited.

DAVID H. RUBIN, *Primary Examiner.*

JOHN K. CORBIN, *Examiner.*

R. J. STERN, *Assistant Examiner.*

UNITED STATES PATENT OFFICE
CERTIFICATE OF CORRECTION

Patent No. 3,241,443                                March 22, 196

Harold E. Rosenberger

It is hereby certified that error appears in the above numbered patent requiring correction and that the said Letters Patent should read as corrected below.

Column 2, line 37, for "$R_9 \pm (F_I + F_{II} + F_{III} + F_{IV})$" read -- $R_9 > \pm (F_I + F_{II} + F_{III} + F_{IV})$ --; line 49, in the table heading of the third column thereof, for "$\mu$" read -- $\nu$ --; column 3, line 39, in the table, in the heading to the third column thereof, for "$\mu$" read -- $\nu$ --; columns 3 and 4, line 49, in the table, in th heading to the seventh column thereof, for "$\mu$" read -- $\nu$ --; column 4, line 64, in the table in the heading to the third column thereof, for "$\mu$" read -- $\nu$ --; column 6, line 2, in the table, in the heading to the third column thereof, for "$\mu$" read -- $\nu$ --.

Signed and sealed this 12th day of September 1967.

(SEAL)
Attest:

ERNEST W. SWIDER                                   EDWARD J. BRENNER
Attesting Officer                                  Commissioner of Patent